(12) United States Patent
Westfall et al.

(10) Patent No.: US 7,009,750 B1
(45) Date of Patent: Mar. 7, 2006

(54) APPARATUS AND METHODS FOR MODULATING REFRACTIVE INDEX

(75) Inventors: Raymond T. Westfall, Seminole, FL (US); Howard P. Groger, Gainesville, FL (US)

(73) Assignee: Eclipse Energy Systems, Inc., St. Petersburg, FL (US)

( * ) Notice: Subject to any disclaimer, the term of this patent is extended or adjusted under 35 U.S.C. 154(b) by 0 days.

(21) Appl. No.: 10/692,522

(22) Filed: Oct. 24, 2003

Related U.S. Application Data

(60) Provisional application No. 60/421,617, filed on Oct. 25, 2002.

(51) Int. Cl.
  *G02F 1/01* (2006.01)

(52) U.S. Cl. ............... 359/240; 359/260; 359/321; 359/322

(58) Field of Classification Search .......... 359/240, 359/241, 260, 321, 322, 578, 580, 585; 385/2
  See application file for complete search history.

(56) References Cited

U.S. PATENT DOCUMENTS

| | | | |
|---|---|---|---|
| 3,317,266 A | 5/1967 | Heller et al. ............ 359/275 |
| 3,552,824 A | 1/1971 | Kiss ..................... 359/241 |
| 4,514,053 A | 4/1985 | Borrelli et al. ........... 359/569 |
| 4,709,978 A | 12/1987 | Jackel ..................... 385/3 |
| 4,831,631 A | 5/1989 | Haeussler et al. .......... 372/92 |
| 4,867,522 A | 9/1989 | Cassidy ..................... 385/1 |
| 4,904,634 A | 2/1990 | Wieserman et al. ........ 502/401 |
| 4,905,169 A | 2/1990 | Buican et al. ............. 356/365 |
| 4,950,074 A | 8/1990 | Fabricius et al. .......... 356/133 |
| 5,007,718 A | 4/1991 | Minoura et al. ........... 359/265 |
| 5,068,208 A | 11/1991 | Haun et al. ............... 501/12 |
| 5,128,223 A | 7/1992 | Gillberg-LaForce et al. ... 430/2 |
| 5,132,811 A | 7/1992 | Iwaki et al. .............. 359/6 |
| 5,153,771 A | 10/1992 | Link et al. ............... 359/286 |
| 5,185,842 A | 2/1993 | Hakogi et al. ............. 385/129 |
| 5,220,627 A | 6/1993 | Kawano et al. ............. 385/3 |
| 5,221,957 A | 6/1993 | Jannson et al. ............ 356/301 |
| 5,223,910 A | 6/1993 | Simeoni et al. ............ 356/456 |
| 5,250,811 A | 10/1993 | Lippert et al. ........... 250/339.09 |
| 5,267,336 A | 11/1993 | Sriram et al. ............. 385/2 |
| 5,291,314 A | 3/1994 | Agranat et al. ............ 359/11 |
| 5,345,328 A | 9/1994 | Fritz et al. .............. 359/248 |
| 5,356,663 A | 10/1994 | Perusich et al. ........... 427/140 |

(Continued)

OTHER PUBLICATIONS

Artuso, F. et al., "Fe-containing CeVO4 films as Li Intercalation transparent counter-electrodes," *Electrochimica Acta*, vol. 46, Nos. 13 and 14, pp. 2077-2084 (2001).

(Continued)

*Primary Examiner*—Jordan M. Schwartz
*Assistant Examiner*—Jessica Stultz
(74) *Attorney, Agent, or Firm*—Fish & Neave IP Group of Ropes & Gray LLP

(57) ABSTRACT

An iono-refractive structure that includes one or more ion insertion layers having a real portion and an imaginary portion of the dielectric constant is provided. While both the real portion and the imaginary portion of the dielectric constant change, the change in the imaginary portion is less than the change in the real portion at the wavelength of interest or at the operational wavelength. The iono-refractive structure may be suitable for the fabrication of or integration with tunable optical filters, wavelength-selective optical elements, active modulated interferometers, optical phase shifters, optical phased array beam steering, optical phased array beam tracking, tunable optical filters, sensors, variable lenses, tunable diffraction gratings, and other optical components.

69 Claims, 3 Drawing Sheets

100

| | |
|---|---|
| SECOND ELECTRODE LAYER | 110 |
| ION INSERTION LAYER | 108 |
| INTERFACE LAYER | 114 |
| ION CONDUCTION LAYER | 106 |
| ION STORAGE LAYER | 112 |
| FIRST ELECTRODE LAYER | 104 |
| SUBSTRATE | 102 |

U.S. PATENT DOCUMENTS

| | | | |
|---|---|---|---|
| 5,377,026 A | 12/1994 | Liu et al. | 349/37 |
| 5,396,328 A | 3/1995 | Jestel et al. | 356/482 |
| 5,408,353 A | 4/1995 | Nichols et al. | 359/275 |
| 5,418,871 A | 5/1995 | Revelli et al. | 385/44 |
| 5,423,967 A | 6/1995 | Kunimatsu et al. | 600/109 |
| 5,440,143 A | 8/1995 | Carangelo et al. | 250/573 |
| 5,483,344 A | 1/1996 | Frot et al. | 356/484 |
| 5,506,919 A | 4/1996 | Roberts | 385/1 |
| 5,510,914 A | 4/1996 | Liu et al. | 349/136 |
| 5,532,488 A | 7/1996 | Ishibashi et al. | 250/341.3 |
| 5,539,518 A | 7/1996 | Bennett | 356/452 |
| 5,546,494 A | 8/1996 | Eda | 385/129 |
| 5,604,581 A | 2/1997 | Liu et al. | 356/73 |
| 5,631,765 A | 5/1997 | Baur et al. | 359/267 |
| 5,640,267 A | 6/1997 | May et al. | 359/322 |
| 5,655,530 A | 8/1997 | Messerschmidt | 600/366 |
| 5,739,948 A | 4/1998 | Kushibiki et al. | 359/321 |
| 5,756,197 A * | 5/1998 | Statz et al. | 428/323 |
| 5,781,670 A | 7/1998 | Deacon et al. | 385/10 |
| 5,815,628 A | 9/1998 | Ueno et al. | 385/131 |
| 5,830,622 A | 11/1998 | Canning et al. | 430/321 |
| 5,852,688 A | 12/1998 | Brinkman et al. | 385/16 |
| 5,887,089 A | 3/1999 | Deacon et al. | 385/22 |
| 5,911,018 A | 6/1999 | Bischel et al. | 385/16 |
| 5,917,980 A | 6/1999 | Yoshimura et al. | 385/129 |
| 5,943,122 A | 8/1999 | Holmes | 356/73 |
| 5,953,466 A | 9/1999 | Kubota et al. | 385/2 |
| 5,970,190 A | 10/1999 | Fu et al. | 385/37 |
| 5,976,717 A | 11/1999 | Holdik et al. | 428/699 |
| 5,986,798 A | 11/1999 | Karlsson et al. | 359/326 |
| 6,011,881 A | 1/2000 | Moslehi et al. | 385/10 |
| 6,016,199 A | 1/2000 | Newton | 356/519 |
| 6,042,992 A * | 3/2000 | Dammel et al. | 430/290 |
| 6,067,391 A | 5/2000 | Land | 385/27 |
| 6,084,050 A | 7/2000 | Ooba et al. | 528/42 |
| 6,091,184 A | 7/2000 | De Vries | 313/110 |
| 6,111,682 A | 8/2000 | Minakata et al. | 359/245 |
| 6,137,576 A | 10/2000 | Pauluth et al. | 356/517 |
| 6,167,169 A | 12/2000 | Brinkman et al. | 385/4 |
| 6,195,196 B1 | 2/2001 | Kimura et al. | 359/295 |
| 6,215,585 B1 | 4/2001 | Yoshimura et al. | 359/344 |
| 6,221,565 B1 | 4/2001 | Jain et al. | 430/321 |
| 6,225,630 B1 | 5/2001 | Slater et al. | 250/343 |
| 6,297,880 B1 | 10/2001 | Rosencwaig et al. | 356/369 |
| 6,301,399 B1 | 10/2001 | Mahapatra et al. | 385/2 |
| 6,321,009 B1 | 11/2001 | Koerkamp et al. | 385/45 |
| 6,337,931 B1 | 1/2002 | Seino | 385/11 |
| 6,359,733 B1 | 3/2002 | Iwatsuka et al. | 359/500 |
| 6,393,172 B1 | 5/2002 | Brinkman et al. | 385/16 |
| 6,417,921 B1 | 7/2002 | Rosencwaig et al. | 356/369 |
| 2003/0142943 A1 * | 7/2003 | Yegnanarayanan et al. | 385/131 |
| 2003/0227664 A1 * | 12/2003 | Agrawal et al. | 359/269 |

OTHER PUBLICATIONS

Atherton, P.D. et al., "Tunable Fabry-Perot filters," *Optical Engineering*, vol. 20, pp. 806-814 (1981).

Dialog abstract of Bittebierre, J. and Lazarides, B., "Narrow-bandpass filters with broad rejection band for single-mode waveguides," *Applied Optics*, vol. 40, No. 1, pp. 11-19 (2001).

Dialog abstract of Blanca, C.M. et al., "Electrically tunable optical filter for visible wavelength using a liquid crystal multiplexed to a Fabry-Perot etalon," *Molecular Crystals and Liquid Crystals*, vol. 368, pp. 4023-4030 (2001).

Dialog abstract of Bobitski, Y.V. and Fitio, V.M., "Analysis of multilayered holograms properties by coupled waves method," *Proceedings of the SPIE—The International Society for Optical Engineering*, vol. 4425, pp. 444-451 (2001).

Dialog abstract of Braunstein, R., "Electrochromic glasses," *California Univ.*, ARO-14249-14P (1980).

Dialog abstract of Dutta, G.S. and Agarwal, G.S., "Line narrowing In cavity quantum electrodynamics by intracavity Index modulation," *Optics Communications*, vol. 103, Nos. 1 and 2, pp. 122-129 (1993).

Dialog abstract of Gesualdi, M.R.R. et al., "Holographic interferometry techniques using photorefractive crystals of sillenite family Bi/sub 12/SIO/sub 20/ (BSO) and their applications in analysis of surfaces," *Proceedings of the SPIE—The International Society for Optical Engineering*, vol. 4419, pp. 256-260 (2001).

Dialog abstract of Grandqvist, C.G. and Lampert, C.M., "Optical materials technology for energy efficiency and solar energy conversion," *Society of Photo-Optical Instrumentation Engineers (SPIE Proceedings)*, vol. 1272, p. 327 (1990).

Abstract of Green, M. et al., "Lithium vanadium bronze thin films for electrochromic applications," *Journal of Applied Physics*, vol. 81, No. 8, pp. 3592-3600 (1997).

Dialog abstract of He, J. and Cada, M., "Optical bistability in semiconductor periodic structures," *IEEE Journal of Quantum Electronics*, vol. 27, No. 5, pp. 1182-1188 (1991).

Hussain, Z., "Dopant-dependent reflectivity and refractive index of microcrystalline molybdenum-bronze thin films," *Journal of Applied Physics*, vol. 91, No. 9, pp. 5745-5759 (2002).

Hutchins, M.G. et al., "Electrochromic tungsten oxide films for Variable reflectance devices," *Proceedings of the SPIE—The International Society for Optical Engineering*, vol. 4458, pp. 138-145 (2001).

Hutchins, M.G. et al., "Infrared reflectance modulation In tungsten oxide based electrochromic devices," *Electrochimica Acta*, vol. 46, pp. 1983-1988 (2001).

Isidorsson, J. et al., "Ellipsometry on sputter-deposited tin-oxide films: optical constants versus stoichiometry, hydrogen content and amount of electrochemically intercalated lithium," *Applied Optics*, vol. 37, pp. 7334-7341 (1998).

Leveque et al., "Determination of optical constants of thin film from relectance spectra," *Applied Optics*, vol. 29, No. 22, pp. 3207-3212 (1990).

Dialog abstract of Lewis, K.L., "Tunable, bistable and active filters," *Proceedings of the SPIE—The International Society for Optical Engineering*, vol. 2253, pp. 922-934 (1994).

Luo X. et al., "Transparent ion-conducting ceria-zirconia films made by sol-gel technology," *Solar Energy Materials and Solar Cells*, vol. 53, pp. 341-347 (1998).

Marinelli, W.J. et al., "A tunable Fabry-Perot etalon-based long-wavelength infrared imaging spectroradiometer," *Applied Optics*, vol. 38, No. 16, pp. 2594-2604 (2000).

Dialog abstract of Menez, L. et al., "Diffraction efficiency of an index grating in a Fabry-Perot resonator," Summaries of papers presented at the 1999 Conference on Lasers and Electro-Optics, postconference edition, pp. 280 (1999).

Dialog abstract of Patel, J.S. et al., "Electrically tunable optical filter for infrared wavelength using liquid crystals in a Fabry-Perot etalon," *Applied Physics Letters*, vol. 57, No. 17, pp. 1718-1720 (1990).

Rubin, M. et al., "Optical Indices of lithlated electrochromic oxides," SPIE International Symposium on Optical Materials Technology for Energy Efficiency and Solar Energy Conversion XV, Freiburg, Germany (1996).

Abstract of Salinga et al., "Gasochromic tungsten oxide films (WO3): A correlation between film properties and coloration kinetics" (2002).

Schanze, K.S. et al., "Photolithographically-patterned electroactive films and electrochemically modulated diffraction gratings," *Langmuir*, vol. 16, pp. 795-810 (1999).

Abstract of Schneider, J.M. et al., "Hydrogen uptake in alumina thin films synthesized from an aluminum plasma stream in an oxygen ambient," *Applied Physics Letters*, vol. 74, No. 2, pp. 200-202 (1999).

Abstract of Simmons-Potter, K. and Potter, Jr., B.G., "Optically imprinted refractive index modulation in photosensitive glass thin films" (1996).

Dialog abstract of Swanson, D.A. and Laux, L., "Tunable solid state infrared filters for multispectral Imaging," *Proceedings of the SPIE—The International Society for Optical Engineering*, vol. 1690, pp. 92-103 (1992).

Dialog abstract of Townsend, P.D. et al., "Measurement of the refractive-index modulation generated by electrostriction-induced acoustic waves in optical fibers," *Optics Letters*, vol. 21, No. 5, pp. 333-335 (1996).

Van der Sluis, P. and Mercier V.M.M., "Solid state Gd−Mg electrochromic devices with ZrO2Hx electrolyte," *Electrochimica Acta*, vol. 46, Nos. 13 and 14, pp. 2167-2171 (2001).

Von Rottkay, K. et al., "Influence of stoichiometry on electrochromic cerium-titanium oxide compounds," *Solid State Ionics*, vols. 113-115, pp. 425-430 (1998).

Abstract of Von Rottkay, K. et al., "Refractive index changes of Pd-coated magnesium lanthanide switchable mirrors upon hydrogen insertion," *Journal of Applied Physics*, vol. 85, No. 1, pp. 408-413 (1999).

* cited by examiner

APPARATUS AND METHODS FOR MODULATING REFRACTIVE INDEX

CROSS-REFERENCE TO RELATED APPLICATIONS

This application claims the benefit of U.S. provisional application No. 60/421,617, filed Oct. 25, 2002, which is hereby incorporated by reference herein in its entirety.

BACKGROUND OF THE INVENTION

The present invention relates to apparatus and methods for modulating refractive index. More particularly, the invention relates to inducing a change of refractive index in one or more layers of an iono-refractive structure that are capable of ion intercalation or release. The ion intercalation or release is accompanied by a change of refractive index without a significant increase in the optical absorption at the wavelength of interest or at the operating wavelength. The structure may be suitable for the fabrication of or integration with tunable optical filters, wavelength-selective optical elements, active modulated interferometers, variable phase shifters, sensors, lenses, and other optical components.

Various approaches have been employed for modulating refractive index in a wide range of optical devices including interferometric optical waveguide-based switches, light detection and ranging (LIDAR) remote sensors, optical Doppler Tomography, filters for optical communications, and instruments to detect displacement. In most instances, modulating refractive index involves application of a voltage across a liquid crystal film, or across an electro-optical film, such as lithium niobate, or through carrier induced refractive index changes in, for example, gallium arsenide (GaAs). Elasto-optic, magneto-optic, and acousto-optic effects can also provide a change in refractive index.

It has been shown that the refractive index of many semiconducting metal oxides depends on the degree of intercalation of ions entering the matrix—i.e., the extent to which ions are inserted into the metal oxide. For example, the real and imaginary portions of the refractive index of tungsten oxide at 550 nm change significantly as lithium ions are inserted into the tungsten oxide (Rubin et al., "Optical Indices of Lithiated Electrochromic Oxides," in *Lawrence Berkeley National Labs Publication* 39410 (1996)). As described by Rubin, the real portion of the refractive index changes from 1.95 to 1.7 after ion intercalation while the imaginary portion of the refractive index changes by 0.1. At longer wavelengths, there may be little or no change of the real portion of the refractive index as the imaginary portion of the refractive index changes from an extinction coefficient of 0 to 0.65.

Meanwhile, a considerable change in the refractive index of sputtered tungsten oxide with lithium ion insertion has been observed in the 2 micron to 12 micron wavelength range (Hutchins et al., "Infrared Reflectance Modulation in Tungsten Oxide Based Electrochromic Devices," *Electrochemica Acta*, Vol. 46, at 1983–1988 (2001)). Such a change in refractive index of tungsten oxide could be used to create a front surface reflectance device (Hutchins et al., "Electrochromic Tungsten Oxide Films for Variable Reflectance Devices," *Proceedings of the SPIE*, Vol. 4458, at 138–145 (2001)).

This follows in part from the relationship between the real portion of the dielectric constant, $\epsilon_r$, determined by the phase velocity, and the imaginary portion of the dielectric constant, $\epsilon_i$, determined by the absorption. The dielectric constant is also proportional to the square of the refractive index, thus the refractive index also has a real portion and an imaginary portion. It is well known from the Kramers-Kronig equation that the real portion of the dielectric constant can be expressed as an integral of the imaginary portion.

$$\epsilon_r(\omega_0) = 1 + \frac{2}{\pi} \cdot P \int_0^\infty \frac{\omega \cdot \epsilon_i(\omega)}{\omega^2 - \omega_0^2} d\omega$$

$$\epsilon_i(\omega_0) = -\frac{2}{\pi} \cdot P \int_0^\infty \frac{\omega_0 \cdot (\epsilon_r(\omega) - 1)}{\omega^2 - \omega_0^2} d\omega$$

where $\omega$ is the complex angular frequency, $\omega_o$ refers to the frequency of an optical transition, and P is the principal value of the integral. It should be noted that the Kramers-Kronig equation may not be completely valid for thin films (Leveque et al., "Ellipsometry on Sputter-Deposited Tin-Oxide Films: Optical Constants Versus Stoichiometry, Hydrogen Content, and Amount of Electrochemically Intercalated Lithium," *Applied Optics*, Vol. 37, at 7334–7341 (1990)).

However, many of these approaches that provide a change in refractive index are based on the alteration of the extinction coefficient, density, or coloration of their respective devices. Such approaches are described, for example, in Lach et al. U.S. Pat. No. 6,498,358. Moreover, while each of these approaches provides some change in refractive index, these approaches generally suffer from high manufacturing costs, constraints on the operating environment (e.g., temperature and pressure), and drawbacks related to system and substrate compatibility. Even further, many of these approaches significantly change the transmissivity while changing the refractive index, thereby limiting the applicability of the device.

It would therefore be desirable to provide apparatus and methods for modulating refractive index without significantly altering the transmissivity.

It would also be desirable to provide apparatus and methods for modulating refractive index that is easily integrated with optical components.

It would also be desirable to provide apparatus and methods for modulating refractive index via the insertion of an ionic species into an intercalating metal oxide without significantly altering the transmissivity of the metal oxide.

SUMMARY OF THE INVENTION

In accordance with this invention, a thin film structure that is capable of ion intercalation or release, where the ion intercalation or release is accompanied by a change of refractive index without significant optical absorption at the wavelength of interest or at the operating wavelength is provided. The thin film structure is referred to herein as an "iono-refractive structure" because it includes one or more ion insertion layers having a real portion and an imaginary portion of the dielectric constant. While both the real portion and the imaginary portion of the dielectric constant change, the change in the imaginary portion is either less than the change in the real portion or limited to acceptable values specific to the operation of a particular device at the wavelength of interest or at the operational wavelength. The iono-refractive structure may be suitable for the fabrication of or integration with tunable optical filters, wavelength-selective optical elements, active modulated interferometers, variable phase shifters, sensors, lenses, and other optical components.

The iono-refractive structure may include an ion conduction layer and an ion insertion layer. The ion conduction layer is preferably a material selected for its compatibility with the ion insertion layer. Ion conduction layer may be a layer of metal oxide, such as, for example, lithium phosphorous oxynitride, lithium aluminium fluoride, lithium phosphate, or lithium orthophosphate, lanthanum lithium titanate. The ion insertion layer is preferably a metal oxide, such as vanadium pentoxide or $Li_2O$—$P_2O_5$—$WO_3$, deposited on the surface of the ion conduction layer.

In response to the application of an electric field across the ion insertion layer and the ion conduction layer, ions are inserted from the ion conduction layer to the ion insertion layer. In some embodiments, an ion storage layer may be provided that store ions for transport across the ion conduction layer and into the ion insertion layer. The response to inserting ions into the ion insertion layer includes a change in both the real portion and the imaginary portion of the dielectric constant. The change in the imaginary portion of the dielectric constant is less than the change of the real portion of the dielectric constant at the wavelength of interest or at the operational wavelength.

The change in the dielectric constant may be reversed. Ions may be extracted from the ion insertion layer back to the ion conduction layer. Subjecting the ion insertion layer to these conditions may lead to cases which result in a change of the imaginary portion of the dielectric constant to a value that is within 2% of the initial imaginary portion and a change of the real portion of the dielectric constant to a value that is within 2% of the initial real portion.

In some embodiments, the iono-refractive structure may be included in embodiments where the beam of light enters perpendicular to the plane of the device (e.g., wavelength filters, Fabry-Perot interferometers, multiple layer dielectric coatings, laser external cavities, etc.). In other suitable embodiments, the iono-refractive structure may be include in embodiments where the light beam propagates along the plane of the device (e.g., by an external coupler or generated by a laser or a light-emitting diode coupled directly to an optical waveguide). Such embodiments may include, for example, active interferometers, Fourier Transform Interferometers (FTIR), lenses with variable focal length, and various communications devices.

BRIEF DESCRIPTION OF THE DRAWINGS

The above and other objects and advantages of the invention will be apparent upon consideration of the following detailed description, taken in conjunction with accompanying drawings, in which like reference refers to like parts throughout, and in which:

FIGS. 3A–3F show illustrative optical waveguide structures that may be controlled by an iono-refractive structure in accordance with various embodiments of the present invention.

DETAILED DESCRIPTION OF THE INVENTION

The present invention involves thin film structures. For convenience herein, these thin film structures are sometimes referred to as "iono-refractive structures" or "iono-refractive circuits" because they include one or more ion insertion layers having a real portion and an imaginary portion of the dielectric constant. While both the real portion of the dielectric constant and the imaginary portion of the dielectric constant change, the change in the imaginary portion is either less than the change in the real portion or limited to acceptable values specific to the operation of a particular device at the wavelength of interest or at the operational wavelength.

Figure 1:
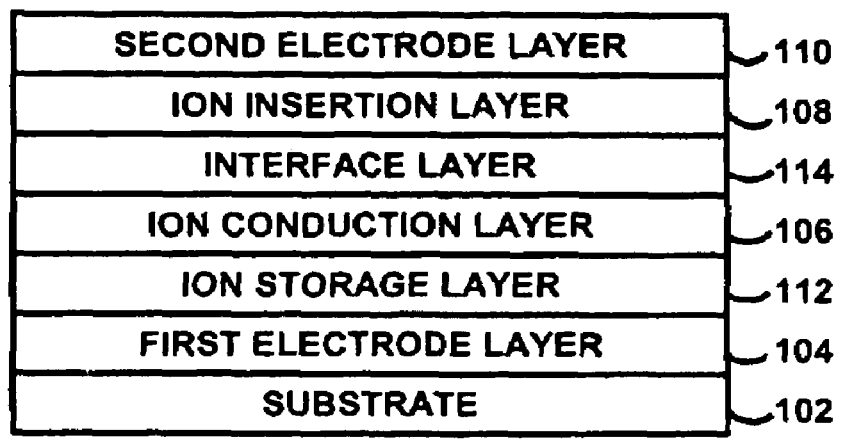
FIG. 1 is a cross-sectional view of an iono-refractive structure in accordance with various embodiments of the present invention.

FIG. 1 illustrates schematically, in cross section, a portion of an iono-refractive structure 100 which may be relevant to or useful in connection with certain embodiments of the present invention. Structure 100 includes a substrate 102, a first electrode layer 104, an ion conduction layer 106, an ion insertion layer 108, and a second electrode layer 110.

As used herein, the term "layer" refers to any suitable layer, region, film, or any other variation thereof, deposited using any suitable technique.

In accordance with some embodiments, structure 100 may also include an ion storage layer 112 positioned between first electrode layer 104 and ion conduction layer 106. Structure 100 may also include an interface layer 114 at the interface between the ion conduction layer 106 and the ion insertion layer 108. As will be explained more fully below, interface layer 114 helps in maintaining uniform and accelerated ion flow from ion storage layer 112 or ion conduction layer 106 into ion insertion layer 108.

In some embodiments, substrate 102 may be substantially transparent. Substrate 102 may be a glass substrate, a polymeric substrate, or any other suitable substrate that is substantially transparent. In other embodiments, substrate may be a reflective, opaque, or partially transparent substrate. Substrate 102 may also take the form of nonplanar complex shapes, patterns, arrays or designs.

First electrode layer 104 and second electrode layer 110 are preferably conductive oxide layers that are substantially transparent. Although first electrode layer 104 and second electrode layer 110 are generally described herein as being substantially transparent, this embodiment is not limited only to substantially transparent conductive oxide electrodes. Rather, first electrode layer 104 and/or second electrode layer 110 may be reflective, opaque, or partially transparent. Materials that are suitable for first electrode layer 104 and second electrode layer 110 include, for example, indium tin oxide (ITO), fluorine-doped tin oxide ($SnO_2$:F), antimony-doped tin oxide ($SnO_2$:Sb), members of the family $In_2O_3$—$Ga_2O_3$—$ZnO$, any other suitable metals, and any other suitable electrically conductive materials. In some embodiments, first electrode layer 104 and second electrode layer 110 may be formed in nonplanar complex shapes, patterns, arrays or designs to control distributions of indexes of refraction. First electrode layer 104 and second electrode layer 110 may be formed to produce a uniform change in the refractive index or a spatially non-uniform distribution in the index of refraction.

Ion conduction layer 106 is preferably a material selected for its compatibility with the overlying ion insertion layer 108. Materials that are suitable for ion conduction layer 106 include lithium phosphorous oxynitride, lithium aluminium fluoride, lithium phosphate, lithium orthophosphate, lanthanum lithium titanate, and families of materials of the composition $Li_2O—P_2O_5—[A_bO_x]$, where $A_bO_x$ may be $WO_3$, $TiO_2$ or $Fe_2O_3$, or any appropriate combination thereof. Generally, these materials are metal oxides that include lithium. In some embodiments, the thickness of ion conduction layer 106 is substantially thin to minimize the required electric field for transporting ions across ion conduction layer 106—i.e., a thin ion conduction layer 106 reduces the transit time of ions across ion conduction layer 106. Typically, ion conduction layer 106 has a thickness less then about 0.10 microns.

Ion insertion layer 108 is preferably a metal oxide deposited on the surface of ion conduction layer 106. Ion insertion layer 108 is preferably selected for its capability of being intercalated with ions. Materials that are suitable for ion insertion layer 108 include oxides of tungsten, niobium, vanadium, cerium, titanium, molybdenum, nickel, and cobalt. In some embodiments, the ion insertion layer is $Li_2O—P_2O_5—WO_3$, in which the $P_2O_5$ composition is about 30% to about 50% of the layer by weight, the $WO_3$ composition is about 20% to about 30% by weight, and the $Li_2O$ composition is the remainder of the layer by weight. In another suitable approach, the ion insertion layer is vanadium pentoxide. When ion insertion layer 108 is vanadium pentoxide, ion insertion layer 108 preferably has a thickness in the range of about 0.25 microns to about 0.6 microns. The ion insertion layer may be deposited by thermal evaporation, electron beam evaporation, chemical vapor deposition, plasma enhanced chemical vapor deposition, magnetron sputtering, ion sputtering, sol-gel deposition, co-deposition with polymeric or transition metal oxide materials, deposition from a melt, or any other suitable approach.

It should also be noted that for optimal use of many of the embodiments described herein may require that ion insertion layer 106 and ion storage layer 108 do not substantially change color (transmissivity) upon oxidation or reduction processes.

Ion storage layer 112 is preferably a material selected for its compatibility with the overlying ion conduction layer 106 and ion insertion layer 108. Materials that are suitable for ion storage layer 112 include cerium oxide, cerium oxide-titanium oxide having a low titanium or a low cerium concentration, cerium vanadate, iron vanadate, cerium oxide-tin oxide, cerium oxide-zirconium oxide, cerium/antimony tin oxide, antimony/tin oxide, molybdenum/tin oxide, indium orthovanadate, tin oxide, iron/vanadium oxide (1:9), iron/titanium oxide, and iron/niobium oxide. When ion storage layer 112 is tin oxide, ion storage layer 112 preferably has a thickness of about 0.25 microns.

Ion storage layer 112 stores ions for transport across ion conduction layer 106 and into ion insertion layer 108. Furthermore, it should be noted that the transmissivity of ion storage layer 112 does not substantially change upon ion egress or ingress. It should also be noted that ion storage layer 112 may be deposited to prevent unwanted electrochemical reactions—e.g., the electrolysis of water.

Interface layer 114 may contribute to uniform ion flow. In some embodiments, interface layer 114 is deposited via co-depositing polyoxometalate or any other suitable first ion conduction cluster as a continuous phase across the boundary between ion conduction layer 106 and ion insertion layer 108 while simultaneously depositing a second ion conduction cluster that is less conducting that the first ion conduction cluster.

In response to the application of an electric field across first electrode layer 104 and second electrode layer 110, ions are inserted from ion conduction layer 106 to ion insertion layer 108. If ion storage layer 112 is present, ions may also be inserted from ion storage layer 112 across ion conduction layer 106. It should also be noted that the insertion of ions into ion insertion layer 108 is reversible. The ions may also be extracted from ion insertion layer 108 and inserted back into ion conduction layer 106, thereby reversing the process.

However, it should be noted that ions may be inserted into or extracted from ion insertion layer 108 using any other suitable approach. For example, instead of applying an electric field, ions may be inserted into ion insertion layer 108 via an electrochemical reaction.

It should also be noted that iono-refractive structure 100 having a vanadium pentoxide ion insertion layer 108 and a tin oxide ion storage layer 112 is especially advantageous because the refractive index of vanadium oxide and the refractive index of tin oxide change in opposite directions upon lithium intercalation.

Referring back to the Kramers-Kronig equation, the dielectric constant of a material has a real portion and an imaginary portion. Typically, the response to inserting ions into ion insertion layer 108 includes a change in both the real portion and the imaginary portion of the dielectric constant. However, subjecting the ion insertion layer to certain conditions may lead to cases which result in a change of the imaginary portion of the dielectric constant ($\Delta_{\epsilon i}$) that is less than the change of the real portion of the dielectric constant ($\Delta_{\epsilon r}$) at the wavelength of interest or at the operation wavelength. Some embodiments may include interaction of ion insertion layer 108 with light at a wavelength having an energy that is considerably less than the bandgap ($E_g$)—i.e., sub-bandgap energy.

The change in the dielectric constant may be reversed. For example, ions may be extracted from the ion insertion layer back to the ion conduction layer. This may result in a change of the imaginary portion of the dielectric constant to a value that is within 2% of the initial imaginary portion of the dielectric constant and a change of the real portion of the dielectric constant to a value that is within 2% of the initial real portion of the dielectric constant.

Some embodiments may include selecting the ion insertion layer and the ion storage layer from materials that are weakly electrochromic. More particularly, a material is strongly electrochromic when the availability of multiple valence states of the ion insertion layer permits the localization of charge on a transition metal site that can be transferred to a neighboring site upon photon absorption—i.e., the small polaron effect. That is, the optical absorption of the ion insertion layer is caused by electron exchange between adjacent transition metal sites. For example, when the ion insertion layer is tungsten oxide ($WO_3$), electrochromism is caused by reduction of $W^{6+}$ states to $W^{5+}$ states upon ion insertion—i.e., small polaron transitions between two nonequivalent sites of tungsten ($W^{5+}$ and $W^{6+}$). The inserted electrons are localized in $W^{5+}$ sites and polarize their surrounding lattice to form small polarons. Incident photons are absorbed by these small polarons that hop from one site to another. The enhancement in the absorption of oxygen deficient $WO_3$ is thought to relate to polarons hopping between $W^{4+}$ and $W^{5+}$ states.

Some embodiments in which the change of the imaginary portion of the dielectric constant is less than the imaginary portion of the dielectric constant may also include a structural transition of the lattice of the ion insertion layer. A structural transition of the lattice provides a change in the refractive index with minimal change in transmissivity. In some embodiments, the change of the lattice structure may accompany lattice expansion or contraction during ion insertion. In other embodiments, a change in lattice structure may result from a thermally-induced lattice expansion or contraction or from following an ion insertion process with an ion implantation process.

Some embodiments may include thermal annealing the ion insertion layer in an oxygen atmosphere. $WO_3$ can be bleached by heating the layer in an oxygen atmosphere. Similarly, a $WO_3$ film fabricated in a high oxygen environment may exhibit reduced coloration efficiency. Thus, annealing the ion insertion layer causes the change in absorption to be diminished. This occurs through reduction of effects associated with polaron hopping between $W^{4+}$ and $W^{5+}$ states.

Some embodiments may include alloying the ion insertion layer with other molecular constituents not providing a small polaronic effect in the wavelength range in which the device operates (such as cerium oxide, tin oxide, vanadium oxide, and any appropriate combinations thereof). As used herein, the term "color center" is used to describe a location of trapped electrons or holes within a metal oxide lattice that gives rise to optical absorption through interaction with incident light. For example, electrons trapped at metal ion sites, such as $W^{6+}$ in $WO_3$ or $Ti^{4+}$ in $TiO_2$, exhibit a broad absorption peak in the infrared and the near infrared spectral range. The number or strength of color centers induced by ion insertion or removal in the ion insertion layer is diminished through alloying.

Some embodiments may include material constituents that diminish the change in optical absorption accompanying ion insertion. This may be accomplished by adding cerium, tin, zirconium, or other metals having oxides that do not lead to significant electrochromic reactions.

However, any other suitable approach for providing a desirable ratio of $\Delta_{\epsilon i}/\Delta_{\epsilon r}$ may also be used. In some embodiments, $\Delta_{\epsilon i}/\Delta_{\epsilon r}$ less than 1.5. In some embodiments, $\Delta_{\epsilon i}/\Delta_{\epsilon r}$ is less than about 0.4. That is, iono-refractive structure 100 is operating at a sub-bandgap wavelength and away from optical absorbance transitions.

The following non-limiting, illustrative examples illustrate various combinations of materials useful in structure 100 in accordance with various alternative embodiments. These examples are merely illustrative, and it is not intended that the invention be limited to these illustrative examples.

These various alternative embodiments may be separated into three groups: embodiments where the beam of light enters perpendicular to the plane of the device, embodiments where the light is coupled to the device—i.e., propagates along the plane of the device, and a combination of the two.

In embodiments where the beam of light enters perpendicular to the plane of the device, the iono-refractive structure may be used for wavelength filtering. Wavelength filters may be useful for fabricating apparatus and structures, such as Fabry-Perot interferometers, multiple layer dielectric coatings, and laser external cavities.

In one embodiment, the iono-refractive structures may be used to fabricate a Fabry-Perot etalon. A Fabry-Perot etalon is the simplest form of a Fabry-Perot interferometer. Generally, a Fabry-Perot etalon makes use of multiple reflections between two closely spaced partially mirrored surfaces. The etalon may have dielectric material of a given index of refraction and a given thickness. A portion of the light is transmitted each time the light reaches the mirrored surface, thereby resulting in multiple offset beams which can interfere with each other. The accumulating number of interfering beams produces an interferometer with high resolution. The etalon may be used as a tunable filter by selecting the index of refraction of the medium in the cavity to select a given resonant wavelength. Using the tunable Fabry-Perot etalon, the bandwidth of each transmission peak is narrow and the given resonant wavelength is transmitted with maximum transmission.

In this embodiment, the iono-refractive structure may modulate the refractive index of one or more coatings on the mirrored or glass plates that form the etalon. The tunable Fabry-Perot etalon may be used to develop a tunable narrow-band filter, which may be used in LIDAR detection, optical communications, or optical non-destructive evaluation (NDE).

The general equation for the transmission coefficient of an ideal Fabry Perot filter is:

$$\frac{I_\lambda}{I_{0\lambda}} = \frac{T(\lambda)^2}{[1-R(\lambda)^2]} \times \left\{ 1 + \left[\frac{2F(\lambda)}{\pi}\right]^2 \sin^2\left[\frac{2\pi d \cos\theta}{\lambda} - \varepsilon(\lambda)\right] \right\}^{-1}$$

In this equation $T(\lambda)$ and $R(\lambda)$ are the wavelength dependent mirror transmission and reflectivity, respectively, and $F(\lambda)$ is the interferometer finesse. The full width half maximum (FWHM) pass-band of the Fabry-Perot filter with light impinging at vertical incidence can be computed from the following equation:

$$\Delta\lambda = \frac{(1-R)\lambda_R^2}{2\pi d(R)^{1/2}}$$

where R is the mirror reflectivity, $\lambda_R$ is the resonance wavelength, and d is the micro-cavity thickness. In some embodiments, the Fabry-Perot can be built as a free-standing device on one side of a substrate. Typically, the total thickness of the device is on the order of about 20 microns. For a micro-cavity thickness of 20 microns, a mirror reflectivity of 0.99, and a resonance wavelength of 1.08 microns, the FWHM is about 1.8 nm.

It should be noted that the parallelism of the Fabry-Perot filter is important to achieve the highest throughput at a given stack thickness. Optical flats may be obtained with a parallelism of less than 3 arc minutes or better.

In another suitable approach, an optical flat may be used as a substrate. Optical flats may be provided having a diameter of 50 mm, flatness of both surfaces to $\lambda/20$, and a surface quality of 60/40 scratch and dig. These surface flats have roughness on the order of about 0.5 nm. For a micro-cavity thickness of 1 mm, a mirror reflectivity of 0.99, and a resonance wavelength of 1.08 microns, the FWHM is about 0.036 nm.

In one example, a vanadium pentoxide layer may be deposited along with a transparent conductive electrode, an ion conduction layer, such as $Li_2O$—$P_2O_5$, and an ion storage layer, such as tin oxide, on one surface of the optical flat and partial mirrors on both surfaces of the optical flat. Depositing a thin film electrode on the free surface of the ion storage layer or the ion conduction layer (e.g., $Li_2O$—$P_2O_5$) as well as on the surface of the ion insertion layer allows the application of an electric field across the ion insertion layer. The electric field drives (i.e., inserts) the lithium or hydrogen ions of the ion storage layer or the ion conduction layer into the ion insertion layer (e.g., vanadium pentoxide layer), thereby altering the refractive index of the vanadium pentoxide while not substantially altering the transmissivity.

In operation, for example, an optical source component may be configured to generate light (e.g., photons) to pass through the Fabry-Perot apparatus. By illuminating the ion insertion layer (e.g., vanadium pentoxide) in the Fabry-Perot apparatus with a light having sub-bandgap energy, the real portion of the refractive index of the ion insertion layer preferably changes by more than about 0.1, while the imaginary portion of the refractive index of the ion insertion layer preferably changes by less than about 0.2 in response to ion insertion by the application of an electric field. The wavelength of light illuminated passing through the ion insertion layer of the Fabry-Perot apparatus corresponds to a sub-bandgap energy, where the sub-bandgap energy is between about 0.5 to about 0.75 of the bandgap of the ion insertion layer. By modulating the real portion of the refractive index without substantially altering the imaginary portion (i.e., transmissivity), the ion insertion layer may be used as a tunable narrow-band filter. Such filters may be used in LIDAR detection, optical communications, or optical non-destructive evaluation (NDE).

The change in refractive index of the vanadium pentoxide layer occurs at an electric field of about 1.0 volts. However, it should be noted that since both vanadium pentoxide and $Li_2O$—$P_2O_5$ are sensitive to humid environments, an insulating protective thin film is preferably deposited over both layers. The insulating protective thin film is preferably aluminum oxide.

Figure 2:
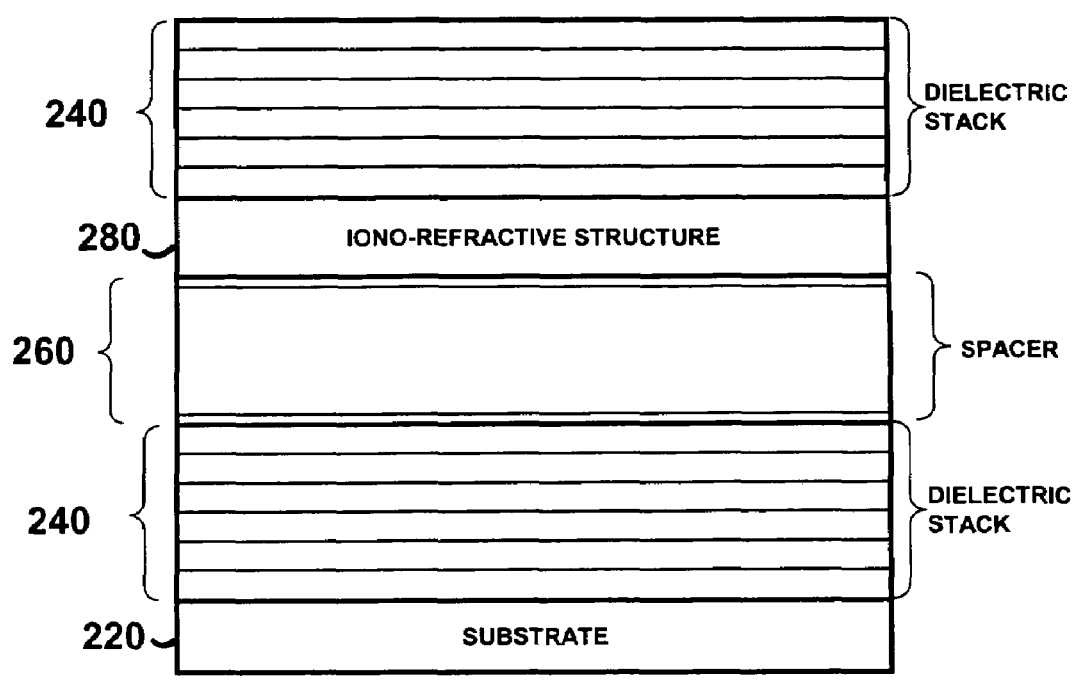
FIG. 2 shows an illustrative tunable Fabry-Perot etalon filter that has an iono-refractive structure in accordance with various embodiments of the present invention.
Figure 3B:
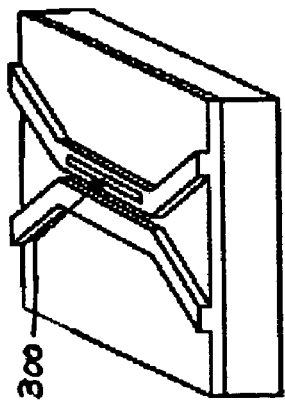
Figure 3B:
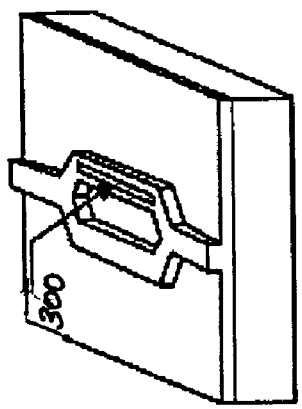
Figure 3A:
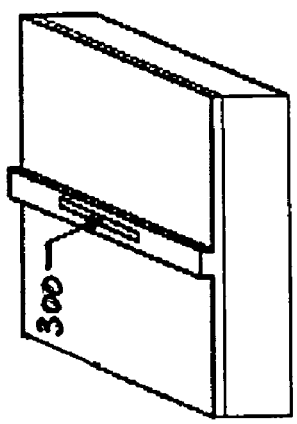
Figure 3F:
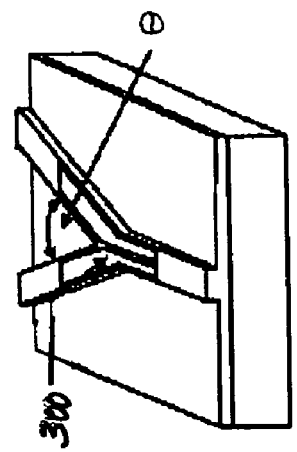
Figure 3E:
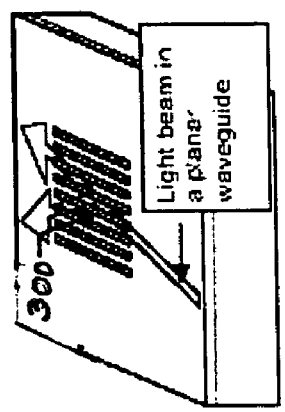
Figure 3D:
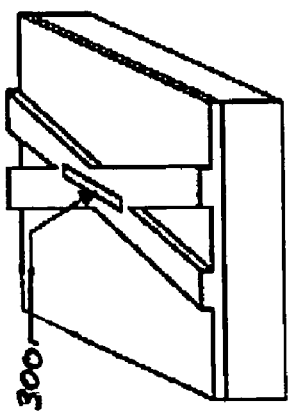

FIG. 2 shows an illustrative tunable Fabry-Perot etalon filter in accordance with various embodiments of the present invention. As shown in FIG. 2, the Fabry-Perot filter includes a substrate 220. Substrate 220 may be a glass substrate, a polymeric substrate, or any other suitable substrate. A dielectric stack 240 may be formed on the substrate to form the first mirror of the Fabry-Perot filter. Dielectric stack 240 may include, for example, alternating layers of dielectric material to alter the reflectance of the Fabry-Perot filter. For example, dielectric stack 240 may include alternating layers of tungsten oxide, lithium orthophosphate, and vanadium oxide. In another suitable example, dielectric stack 240 may include alternating layers of lithium orthophosphate and vanadium oxide.

A low-dielectric constant optically-transmissive spacer 260 may be provided on dielectric stack 240. As shown in FIG. 2, a zinc selenide (ZnSe) optical flat is provided. An iono-refractive structure 280—e.g., a vanadium oxide ion insertion layer, a $Li_2O$—$P_2O_5$ ion conduction layer, and a tin oxide ion storage layer—may be formed on one or both sides of spacer 22. Iono-refractive structure 260 may be used to select the center wavelength of interest. For example, by applying an electric field, ions are inserted from the ion conduction layer to the ion insertion layer. The ion storage layer may also insert ions across ion conduction layer and into the ion insertion layer. The second mirror of the Fabry-Perot filter is formed by depositing another dielectric stack 240 on the iono-refractive structure 260.

The iono-refractive structure 260 may also include electrodes for applying the electric field to produce a uniform change in the refractive index or a spatially non-uniform distribution of the index of refraction in the iono-refractive structure. Materials that are suitable for the electrodes include, for example, indium tin oxide (ITO), fluorine-doped tin oxide ($SnO_2$:F), antimony-doped tin oxide ($SnO_2$:Sb), members of the family of $In_2O_3$—$Ga_2O_3$—$ZnO$, any other suitable metals, and any other suitable electrically conductive materials.

It should also be noted that the iono-refractive structure and the dielectric stack do not change transmissivity while altering the bandwidth of the Fabry-Perot etalon.

In another embodiment, the iono-refractive structure may be used to fabricate multiple layer dielectric coatings. That is, a high reflectance coating may be fabricated from multiple dielectric layers having alternating high refractive index and low refractive index thin films. The optical admittance can be represented a function of the refractive index of the high refractive index layer ($n_H$) and the low refractive index layer ($n_L$).

$$Y = \left(\frac{n_H}{n_L}\right)^{2p} \frac{n_H^2}{n_s}$$

where $n_s$ is the refractive index of the substrate and (2p+1) is the number of layers in the dielectric stack.

In other embodiments where the beam of light is transported in the plane of the device (e.g., by an external coupler or generated by a laser or a light-emitting diode coupled directly to the optical waveguide), the iono-refractive structure may be used to modulate the wavefront of a waveguide. This may be used for fabricating apparatus, such as active interferometers, Fourier Transform interferometers (FTIR), a handheld FTIR, lenses with variable focal length, and various communications devices. These devices may also be designed to alter the direction of the beam propagating in the waveguide or to provide a focus for the beam.

The variable refractive index layers may serve as electric field controlled optical waveguides. FIGS. 3A–3F show illustrative optical waveguide structures that may be controlled by an iono-refractive structure. The waveguides in FIGS. 3A–3F are structures through which optical signals (i.e., light waves) propagate from a first location to a second location. As shown in FIGS. 3A–3F, waveguides may be in any convenient configuration and may include one or more straight segments, curved segments, or combinations of both. FIGS. 3A–3F show an electroabsorption modulator, a Mach-Zehnder modulator, a directional coupler, an X coupler, an acoustooptic (diffraction) modulator, and a mode transformer (digital optical switch), respectively.

Each device shown in FIGS. 3A–3F has an iono-refractive structure 300—e.g., a vanadium pentoxide ion insertion layer, an ion conduction layer, a tin oxide ion storage layer, and a transparent electrically conductive oxide coated on a transparent substrate. In some embodiments, iono-refractive structure 300 may be formed on a portion (e.g., a strip) of the waveguide. Upon applying an electric field across iono-refractive structure 300, the vanadium pentoxide ion insertion layer, ion conduction layer, tin oxide ion storage layer and transparent electrically conductive oxide, a change in the refractive index of the waveguide occurs in the region of iono-refractive structure. This region of altered refractive index may be designed to alter the direction of the beam propagating in the waveguide or provide a focus for the beam.

One application of the electric field controlled optical waveguide would be in the area of beam steering. In one suitable approach, light can propagate in an optical waveguide consisting of a vanadium pentoxide ion insertion layer, an ion conduction layer, a tin oxide ion storage layer, and a transparent electrically conductive oxide coated on a transparent substrate. In this example, the vanadium pentoxide layer has a thickness in the range of about 0.25 microns to about 0.6 microns. The ion conduction layer has a thickness of less than about 0.10 microns and the tin oxide ion storage layer has a thickness in the range of about 0.25 microns to about 0.6 microns. A circular electrode may be formed above the vanadium pentoxide ion insertion layer.

It should be noted that while this example discusses forming a circular electrode above the ion insertion layer, an electrode of any suitable shape may be formed. For example, electrodes having circular, rectangular, cylindrical, or elliptical shapes may be formed. Electrodes may also be formed using any suitable approach, such as, for example, electro-discharge machining (EDM), deposition and patterning, or conventional machining approaches.

Upon applying an electric field across the circular electrode, the vanadium pentoxide ion insertion layer, ion conduction layer, tin oxide ion storage layer and transparent electrically conductive oxide, a change in the refractive index of the waveguide occurs in the region of the circular electrode. This region of altered refractive index— i.e., the region of the circular electrode—may be designed to alter the direction of the beam propagating in the waveguide or provide a focus for the beam.

In several applications the iono-refractive structure may be formed at the surface of an optical waveguide. It should also be noted that the thickness of the ion insertion layer and one of the optically transparent, electrically conducting electrodes is preferably less than the depth of the evanescent field emanating from the waveguide surface.

In yet another embodiment, these electric field controlled optical waveguides may be used to fabricate devices useful in the area of Fourier transform interferometric spectral detection. In this embodiment, light entering the spectrometer passes through a beam splitter connected to two arms of the interferometer. The two arms of the interferometer meet at a location where constructive and destructive interference would take place. Modulation of the refractive index of one of the arms of the interferometer using ion insertion would result in a means of scanning the phase of the interferometer. This approach is useful in biophysical infrared modulation spectroscopy.

The iono-refractive structure may be used to develop a thin-film based phase-shifting interferometer. One or more multiple layered structures each having, for example, a transparent electrically conductive oxide layer, a vanadium pentoxide ion insertion layer, an ion conduction layer, a tin oxide ion insertion layer, and a transparent electrically conductive oxide, may be placed between two thin glass sheets to form a shear plate.

In yet another suitable embodiment, the iono-refractive structure may be integrated with a laser having a lasing mode right at the surface of the laser. The iono-refractive structure may be used to precisely modulate the output wavelength, thereby creating a tunable laser using the iono-refractive structure.

It should be noted that in some of these embodiments, the invention may include a controller (not shown) for calculating the change in refractive index with applied voltage and transferred ionic current. For example, when the iono-refractive structure is used as a wavelength filter, a controller may be provided that uses the change in refractive index with applied voltage and transferred ionic current to determine variables, such as the electric field to be applied.

Thus, methods and apparatus for modulating refractive index using an iono-refractive structure, where the change in the imaginary portion of the dielectric constant is less than the change in the real portion of the dielectric constant, are provided. Persons skilled in the art will appreciate that the present invention can be practiced by other than the described embodiments, which are presented for purposes of illustration and not of limitation, and that the present invention is limited only by the claims which follow.

What is claimed is:

1. A method for modulating a refractive index of an ion insertion layer in an optical device, the ion insertion layer having a dielectric constant, the dielectric constant having a real portion and an imaginary portion, the method comprising:

providing an ion conduction layer adjacent the ion insertion layer; and inserting ions from the ion conduction layer into the ion insertion layer; wherein:

during the inserting, the imaginary portion of the dielectric constant changes from a first value to a second value and the real portion of the dielectric constant changes from a third value to a fourth value at the wavelength of interest or at the operational wavelength; and the absolute value of the difference between the second value and the first value is less than the absolute value of the difference between the fourth value and the third value.

2. The method of claim 1 wherein the absolute value of the difference between the second value and the first value divided by the absolute value of the difference between the fourth value and the third value is less than 0.40.

3. The method of claim 1 wherein the ion insertion layer is vanadium pentoxide.

4. The method of claim 1 wherein the ion conduction layer comprises a metal oxide.

5. The method of claim 1 wherein the ion conduction layer comprises a metal oxide having lithium.

6. The method of claim 1 wherein the ion conduction layer is $Li_2O$—$P_2O_5$—$A_bO_x$, wherein $A_bO_x$ is selected from the group consisting of $WO_3$, $TiO_2$, and $Fe_2O_3$.

7. The method of claim 1 further comprising:

providing an ion storage layer having a transmissivity, wherein the ion storage layer stores ions for transport across the ion conduction layer and into the ion insertion layer and wherein the transmissivity of the ion storage layer is not substantially changed.

8. The method of claim 7 wherein the ion storage layer is tin oxide.

9. The method of claim 7 further comprising providing a transparent electrically conductive oxide adjacent the ion storage layer.

10. The method of claim 1 wherein the ion insertion layer is vanadium pentoxide, the method further comprising:

emitting an optical signal having a wavelength in the range from about 0.8 microns to about 1.7 microns.

11. The method of claim 1 further comprising providing a transparent electrically conductive oxide adjacent the ion insertion layer.

12. The method of claim 1 further comprising providing a transparent electrically conductive oxide adjacent the ion conduction layer.

13. The method of claim 1 wherein the inserting further comprises applying an electric field across the ion insertion layer and the ion conduction layer.

14. The method of claim 1 further comprising:

extracting the ions from the ion insertion layer into the ion conduction layer, wherein:

during the extracting, the imaginary portion of the dielectric constant changes from a second value to a fifth value and the real portion of the dielectric constant changes from a fourth value to a sixth value at the wavelength of interest or at the operational wavelength;

the absolute value of the difference between the fifth value and the second value is less than 2% of the first value; and the absolute value of the difference between the sixth value and the fourth value is less than 2% of the third value.

15. The method of claim 1 wherein the ion insertion layer is formed by a process, wherein the process is selected from the group consisting of thermal evaporation, electron beam evaporation, chemical vapor deposition, plasma enhanced chemical vapor deposition, magnetron sputtering, ion sputtering, sol-gel deposition, co-deposition with polymeric or transition metal oxide materials, and deposition from a melt.

16. The method of claim 1 wherein the ion conduction layer is formed by a process, wherein the process is selected from the group consisting of thermal evaporation, electron beam evaporation, chemical vapor deposition, plasma enhanced chemical vapor deposition, magnetron sputtering, ion sputtering, sol-gel deposition, co-deposition with polymeric or transition metal oxide materials, and deposition from a melt.

17. A method for modulating a refractive index of an ion insertion layer in an optical device, the ion insertion layer having a dielectric constant, the dielectric constant having a real portion and an imaginary portion, the method comprising:

providing an ion conduction layer adjacent the ion insertion layer;

inserting ions from the ion conduction layer into the ion insertion layer; and extracting the ions from the ion insertion layer into the ion conduction layer; wherein:

during the inserting, the imaginary portion of the dielectric constant changes from a first value to a second value and the real portion of the dielectric constant changes from a third value to a fourth value;

the absolute value of the difference between the second value and the first value is less than the absolute value of the difference between the fourth value and the third value;

during the extracting, the imaginary portion of the dielectric constant changes from a second value to a fifth value and the real portion of the dielectric constant changes from a fourth value to a sixth value;

the absolute value of the difference between the fifth value and the second value is less than 2% of the first value; and the absolute value of the difference between the sixth value and the fourth value is less than 2% of the third value.

18. The method of claim 17 wherein the ion insertion layer is formed by a process, wherein the process is selected from the group consisting of thermal evaporation, electron beam evaporation, chemical vapor deposition, plasma enhanced chemical vapor deposition, magnetron sputtering, ion sputtering, sol-gel deposition, co-deposition with polymeric or transition metal oxide materials, and deposition from a melt.

19. The method of claim 17 wherein the ion conduction layer is formed by a process, wherein the process is selected from the group consisting of thermal evaporation, electron beam evaporation, chemical vapor deposition, plasma enhanced chemical vapor deposition, magnetron sputtering, ion sputtering, sol-gel deposition, co-deposition with polymeric or transition metal oxide materials, and deposition from a melt.

20. A method for modulating a refractive index of an ion insertion layer in an optical device, the refractive index having a real portion and an imaginary portion, the method comprising:

providing an ion conduction layer adjacent the ion insertion layer;

inserting ions from the ion conduction layer to the ion insertion layer; and wherein:

during the inserting, the real portion changes from a first value to a second value and the imaginary portion changes from a third value to a fourth value;

the difference between the second value and the first value is greater than 0.1; and the difference between the fourth value and the third value is less than 0.2.

21. The method of claim 20 wherein the ion insertion layer is vanadium pentoxide.

22. The method of claim 20 wherein the ion conduction layer comprises a metal oxide.

23. The method of claim 20 wherein the ion conduction layer comprises a metal oxide having lithium.

24. The method of claim 20 wherein the ion conduction layer is $Li_2O$—$P_2O_5$—$A_bO_x$, wherein $A_bO_x$ is selected from the group consisting of $WO_3$, $TiO_2$, and $Fe_2O_3$.

25. The method of claim 20 further comprising:

providing an ion storage layer having a transmissivity, wherein the ion storage layer stores ions for transport across the ion conduction layer and into the ion insertion layer and wherein the transmissivity of the ion storage layer is not substantially changed.

26. The method of claim 25 wherein the ion storage layer is tin oxide.

27. The method of claim 20 further comprising providing a transparent conductive oxide adjacent the ion storage layer.

28. The method of claim 20 wherein the ion insertion layer is vanadium pentoxide, the method further comprising:

emitting an optical signal having a wavelength in the range from about 0.8 microns to about 1.7 microns.

29. The method of claim 20 further comprising providing a transparent conductive oxide adjacent the ion insertion layer.

30. The method of claim 20 further comprising providing a transparent conductive oxide adjacent the ion conduction layer.

31. The method of claim 20 wherein the inserting further comprises applying an electric field across the ion insertion layer and the ion conduction layer.

32. The method of claim 20 further comprising extracting the ions from the ion insertion layer into the ion conduction layer.

33. The method of claim 20 wherein the ion insertion layer is formed by a process, wherein the process is selected from the group consisting of thermal evaporation, electron beam evaporation, chemical vapor deposition, plasma enhanced chemical vapor deposition, magnetron sputtering, ion sputtering, sol-gel deposition, co-deposition with polymeric or transition metal oxide materials, and deposition from a melt.

34. The method of claim 20 wherein the ion conduction layer is formed by a process, wherein the process is selected from the group consisting of thermal evaporation, electron beam evaporation, chemical vapor deposition, plasma enhanced chemical vapor deposition, magnetron sputtering, ion sputtering, sol-gel deposition, co-deposition with polymeric or transition metal oxide materials, and deposition from a melt.

35. An iono-refractive device comprising:
an ion conduction material; and
an ion insertion material adjacent the ion conduction material, the ion insertion material having a refractive index, the refractive index having a real portion and an imaginary portion; wherein:
upon insertion of ions from the ion conduction layer into the ion insertion layer, the imaginary portion of the refractive index changes from a first value to a second value and the real portion of the refractive index changes from a third value to a fourth value; and
the absolute value of the difference between the second value and the first value is less than the absolute value of the difference between the fourth value and the third value.

36. The device of claim 35 wherein the ion insertion layer is vanadium pentoxide.

37. The device of claim 35 wherein the ion conduction layer comprises a metal oxide.

38. The device of claim 35 wherein the ion conduction layer comprises a metal oxide having lithium.

39. The device of claim 35 wherein the ion conduction layer is $Li_2O$—$P_2O_5$—$A_bO_x$, wherein $A_bO_x$ is selected from the group consisting of $WO_3$, $TiO_2$, and $Fe_2O_3$.

40. The device of claim 35 further comprising an ion storage layer.

41. The device of claim 40 wherein the ion storage layer is tin oxide.

42. The device of claim 40 further comprising a transparent conductive oxide layer adjacent the ion storage layer.

43. The device of claim 35 further comprising a transparent conductive oxide layer adjacent the ion conduction layer.

44. The device of claim 35 further comprising a transparent conductive oxide layer adjacent the ion insertion layer.

45. An iono-refractive device comprising:
an ion conduction material; and
an ion insertion material adjacent the ion conduction material, the ion insertion material having a refractive index, the refractive index having a real portion and an imaginary portion;
wherein upon insertion of ions from the ion conduction layer into the ion insertion layers the real portion of the refractive index changes by more than about 0.1 and the imaginary portion of the refractive index changes by less than about 0.2.

46. The device of claim 45 wherein the ion insertion layer is vanadium pentoxide.

47. The device of claim 45 wherein the ion conduction layer comprises a metal oxide.

48. The device of claim 45 wherein the ion conduction layer comprises a metal oxide having lithium.

49. The device of claim 45 wherein the ion conduction layer is $Li_2O$—$P_2O_5$—$A_bO_x$, wherein $A_bO_x$ is selected from the group consisting of $WO_3$, $TiO_2$, and $Fe_2O_3$.

50. The device of claim 45 further comprising an ion storage layer.

51. The device of claim 50 wherein the ion storage layer is tin oxide.

52. The device of claim 50 further comprising a transparent conductive oxide layer adjacent the ion storage layer.

53. The device of claim 45 further comprising a transparent conductive oxide layer adjacent the ion conduction layer.

54. The device of claim 45 further comprising a transparent conductive oxide layer adjacent the ion insertion layer.

55. An apparatus for modulating a refractive index of an ion insertion layer in an optical device, the ion insertion layer having a dielectric constant, the dielectric constant having a real portion and an imaginary portion, the apparatus comprising:
means for providing an ion conduction layer adjacent the ion insertion layer; and
means for inserting ions from the ion conduction layer into the ion insertion layer; wherein:
during the inserting, the imaginary portion of the dielectric constant changes from a first value to a second value and the real portion of the dielectric constant changes from a third value to a fourth value at the wavelength of interest or at the operational wavelength; and
the absolute value of the difference between the second value and the first value is less than the absolute value of the difference between the fourth value and the third value.

56. The apparatus of claim 55 wherein the ion insertion layer is formed by a process, wherein the process is selected from the group consisting of thermal evaporation, electron beam evaporation, chemical vapor deposition, plasma enhanced chemical vapor deposition, magnetron sputtering, ion sputtering, sol-gel deposition, co-deposition with polymeric or transition metal oxide materials, and deposition from a melt.

57. The apparatus of claim 55 wherein the ion conduction layer is formed by a process, wherein the process is selected from the group consisting of thermal evaporation, electron beam evaporation, chemical vapor deposition, plasma enhanced chemical vapor deposition, magnetron sputtering, ion sputtering, sol-gel deposition, co-deposition with polymeric or transition metal oxide materials, and deposition from a melt.

58. An apparatus for modulating a refractive index of an ion insertion layer in an optical device, the refractive index having a real portion and an imaginary portion, the apparatus comprising:
means for providing an ion conduction layer adjacent the ion insertion layer; and
means for inserting ions from the ion conduction layer to the ion insertion layer; wherein:
during the inserting, the real portion changes from a first value to a second value and the imaginary portion changes from a third value to a fourth value;
the absolute value of the difference between the second value and the first value is greater than 0.1; and
the absolute value difference between the fourth value and the third value is less than 0.2.

59. The apparatus of claim 58 wherein the ion insertion layer is formed by a process, wherein the process is selected from the group consisting of thermal evaporation, electron beam evaporation, chemical vapor deposition, plasma enhanced chemical vapor deposition, magnetron sputtering, ion sputtering, sol-gel deposition, co-deposition with polymeric or transition metal oxide materials, and deposition from a melt.

60. The apparatus of claim 58 wherein the ion conduction layer is formed by a process, wherein the process is selected from the group consisting of thermal evaporation, electron beam evaporation, chemical vapor deposition, plasma enhanced chemical vapor deposition, magnetron sputtering, ion sputtering, sol-gel deposition, co-deposition with polymeric or transition metal oxide materials, and deposition from a melt.

61. A method for modulating a refractive index of an ion insertion layer in an optical device, the refractive index having a real portion and an imaginary portion, the method comprising:
   providing the ion insertion layer that is weakly electrochromic;
   providing an ion conduction layer adjacent the ion insertion layer; and
   inserting ions from the ion conduction layer into the ion insertion layer; wherein:
      during the inserting, the real portion changes from a first value to a second value and the imaginary portion changes from a third value to a fourth value;
      the absolute value of the difference between the second value and the first value is greater than 0.1; and
      the absolute value of the difference between the fourth value and the third value is less than 0.2.

62. The method of claim 61 wherein the ion insertion layer is formed by a process, wherein the process is selected from the group consisting of thermal evaporation, electron beam evaporation, chemical vapor deposition, plasma enhanced chemical vapor deposition, magnetron sputtering, ion sputtering, sol-gel deposition, co-deposition with polymeric or transition metal oxide materials, and deposition from a melt.

63. The method of claim 61 wherein the ion conduction layer is formed by a process, wherein the process is selected from the group consisting of thermal evaporation, electron beam evaporation, chemical vapor deposition, plasma enhanced chemical vapor deposition, magnetron sputtering, ion sputtering, sol-gel deposition, co-deposition with polymeric or transition metal oxide materials, and deposition from a melt.

64. A method for modulating a refractive index of an ion insertion layer in an optical device, the ion insertion layer having a lattice structure, the refractive index having a real portion and an imaginary portion, the method comprising:
   providing an ion conduction layer adjacent the ion insertion layer; and
   inserting ions from the ion conduction layer into the ion insertion layer; wherein:
      during the inserting, the lattice structure of the ion insertion layer changes and the real portion changes from a first value to a second value and the imaginary portion changes from a third value to a fourth value;
      the absolute value of the difference between the second value and the first value is greater than 0.1; and
      the absolute value of the difference between the fourth value and the third value is substantially diminished in response to changing the lattice structure.

65. The method of claim 64 wherein the ion insertion layer is formed by a process, wherein the process is selected from the group consisting of thermal evaporation, electron beam evaporation, chemical vapor deposition, plasma enhanced chemical vapor deposition, magnetron sputtering, ion sputtering, sol-gel deposition, co-deposition with polymeric or transition metal oxide materials, and deposition from a melt.

66. The method of claim 64 wherein the ion conduction layer is formed by a process, wherein the process is selected from the group consisting of thermal evaporation, electron beam evaporation, chemical vapor deposition, plasma enhanced chemical vapor deposition, magnetron sputtering, ion sputtering, sol-gel deposition, co-deposition with polymeric or transition metal oxide materials, and deposition from a melt.

67. A method for modulating a refractive index of an ion insertion layer in an optical device, the refractive index having a real portion and an imaginary portion, the method comprising:
   providing an ion conduction layer adjacent the ion insertion layer;
   annealing the ion insertion layer in an oxygen atmosphere; and
   inserting the ions from the ion conduction layer into the ion insertion layer; wherein:
      during the inserting, the real portion changes from a first value to a second value and the imaginary portion changes from a third value to a fourth value;
      the absolute value of the difference between the second value and the first value is greater than 0.1; and
      the absolute value of the difference between the fourth value and the third value is substantially diminished in response to annealing the ion insertion layer.

68. The method of claim 67 wherein the ion insertion layer is formed by a process, wherein the process is selected from the group consisting of thermal evaporation, electron beam evaporation, chemical vapor deposition, plasma enhanced chemical vapor deposition, magnetron sputtering, ion sputtering, sol-gel deposition, co-deposition with polymeric or transition metal oxide materials, and deposition from a melt.

69. The method of claim 67 wherein the ion conduction layer is formed by a process, wherein the process is selected from the group consisting of thermal evaporation, electron beam evaporation, chemical vapor deposition, plasma enhanced chemical vapor deposition, magnetron sputtering, ion sputtering, sol-gel deposition, co-deposition with polymeric or transition metal oxide materials, and deposition from a melt.

* * * * *